Sept. 5, 1933.  W. H. MOSELEY  1,925,399
VEHICLE BRAKE
Filed March 15, 1932   2 Sheets-Sheet 1
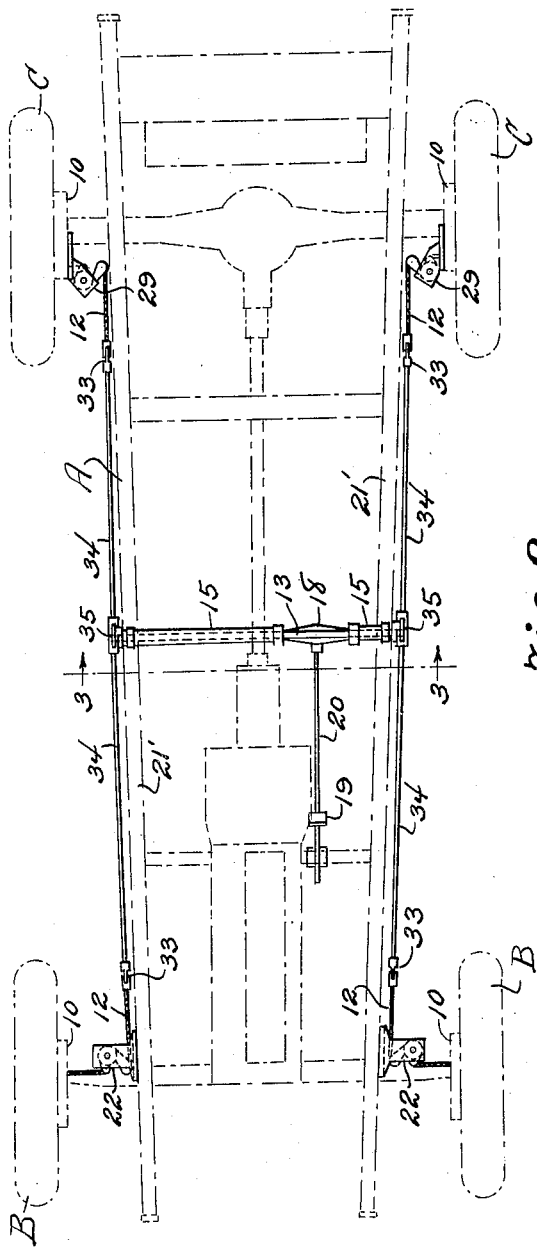
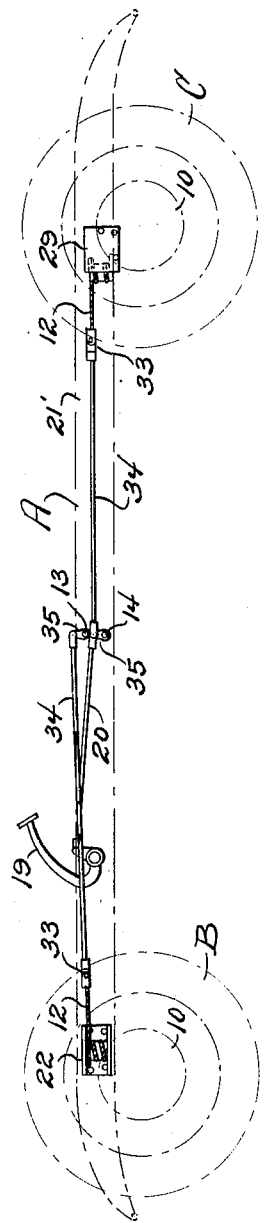
William H. Moseley INVENTOR
BY Victor J. Evans & Co.
ATTORNEY

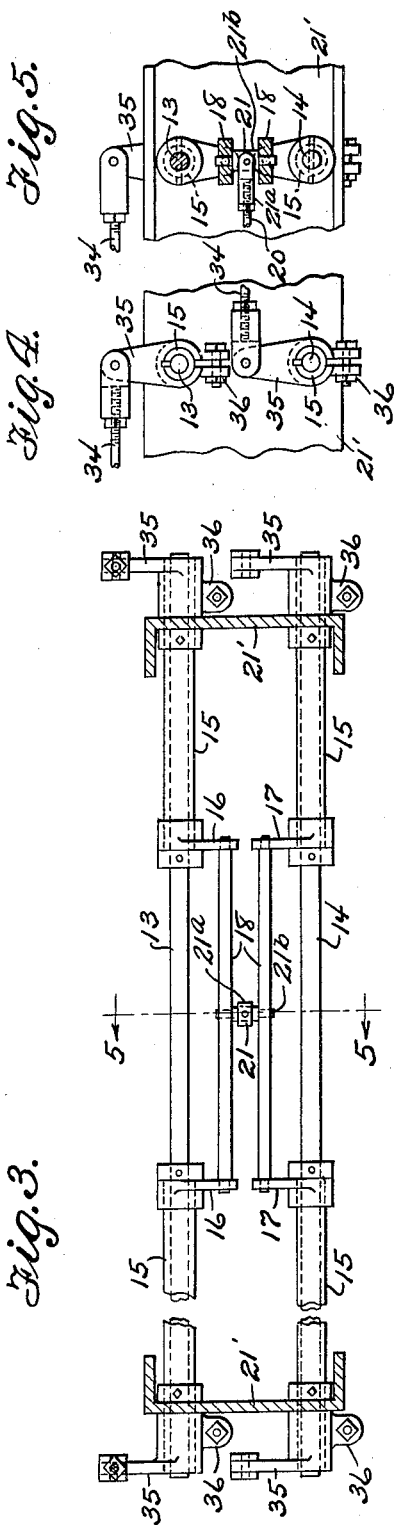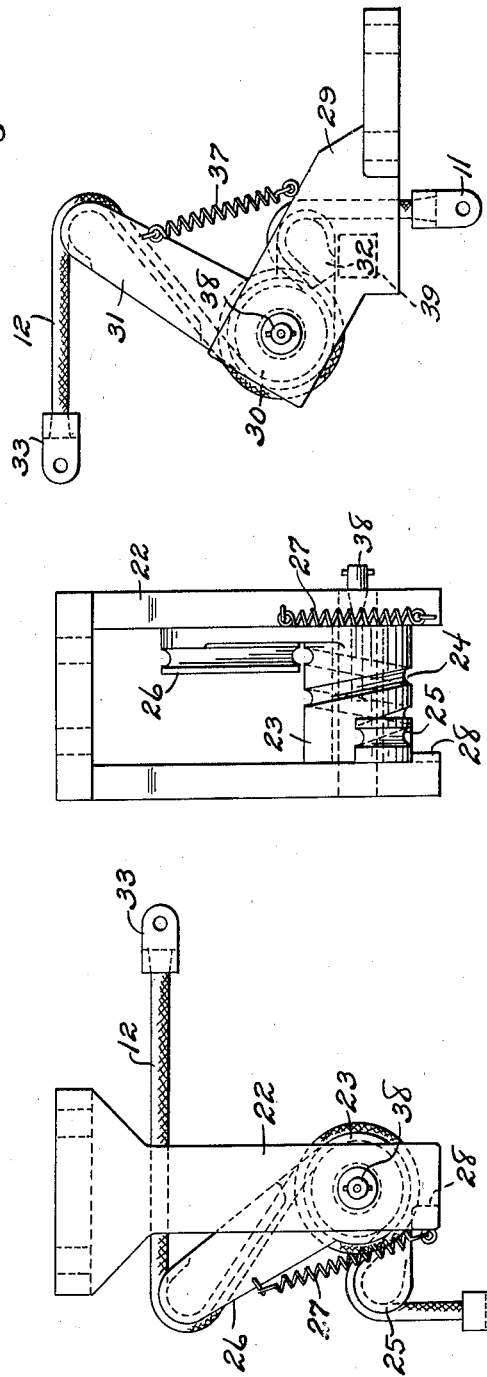

Patented Sept. 5, 1933

1,925,399

UNITED STATES PATENT OFFICE 1,925,399

VEHICLE BRAKE

William H. Moseley, Philadelphia, Pa.

Application March 15, 1932. Serial No. 598,996

5 Claims. (Cl. 188—204)

The invention relates to a vehicle brake and more especially to a brake booster.

The primary object of the invention is the provision of a device of this character, wherein hard brake pedal action is eliminated as well as the brakes sticking in the application thereof and at the same time avoiding unequalized condition at all times in the application of the brakes.

Another object of the invention is the provision of a device of this character wherein a straight pull is had upon the operating cables for the brakes and the brake pedal will maintain a soft cushioning effect, without liability of requiring excessive pressure in the operation thereof for the successful application of the brakes, the device being of novel form and functioning as an equalizer for effecting equal pressure at all times for the brakes.

A further object of the invention is the provision of a device of this character wherein the parts are of simplified form and their assembly novel to assure successful working in the application of the brakes and the equalizing of pressure thereof at all times.

A still further object of the invention is the provision of a device of this character which is extremely simple in construction, thoroughly reliable and efficient in its purpose, strong, durable, readily and easily operated, and inexpensive to manufacture and install.

With these and other objects in view, the invention consists in the features of construction, combination and arrangement of parts will be hereinafter more fully described in detail, illustrated in the accompanying drawings, which disclose the preferred embodiment of the invention, and pointed out in the claims hereunto appended.

In the accompanying drawings:—

Figure 1 is a top plan view of an automobile chassis, its running gear and the brake device constructed in accordance with the invention applied thereto.

Figure 2 is a side elevation.

Figure 3 is an enlarged sectional view taken on the line 3—3 of Figure 1.

Figure 4 is an end elevation of those parts shown in Figure 3.

Figure 5 is a sectional view on the line 5—5 of Figure 3 looking in the direction of the arrows.

Figure 6 is a plan view showing in detail the forward mounting of the brake device.

Figure 7 is a side elevation thereof.

Figure 8 is a view similar to Figure 6 of the rear mounting of the device.

Similar reference characters indicate corresponding parts throughout the several views in the drawings.

Referring to the drawings in detail, A identifies generally the automobile chassis, the same being diagrammatically shown, B the front wheels and C the rear wheels of the running gear thereof, while 10 designates the brake drum for the wheels B and C, the internal parts of the brakes associated with said wheels of the vehicle not being illustrated. The brakes may be of any construction and for the purpose of describing their connections with the device constituting the present invention only those members of their operating mechanism to which flexible cables included in the invention may be attached to set the brakes, have been indicated. Each member above referred to has been designated at 11 and the cable which is attached thereto by the numeral 12. There is employed one cable for each front brake and likewise one cable for each rear brake.

Located at an intermediate portion of the chassis A are upper and lower transversely disposed shafts 13 and 14 respectively upon which are carried sleeves 15, these being spaced apart and have fixed thereto at their inner ends upper and lower pairs of equalizer levers 16 and 17 respectively, these pairs having loosely mounted therein cross connecting bars 18 for the operation of such pairs in unison. In the forward portion of the chassis A is mounted a brake pedal 19 which through the rod 20 has connection by the coupling 21 including a clevis 21a and the pin 21b with the bars 18 of the pairs of levers 16 and 17. The bars 18 medially thereof are formed with suitable holes into each of which enters loosely the pin 21b, this being formed with an enlarged intermediate portion with which the clevis 21a is attached, so that in the working of the brakes equalization between all brakes is effected.

Mounted on the side beams 21' of the chassis A adjacent to the brakes 10 of the front wheel B is a bracket or mounting 22 in which is journaled a spool or roller 23 having a spiral groove 24 for the cable 12 which is trained or wrapped about the spool or roller 23 and has one stretch thereof directed over a short arm 25 and another stretch over a long arm 26, these being at an acute angle with respect to each other, the arms being integrally formed with the roller or spool 23 at opposite ends thereof. The long arm has connected with it and to the mounting or bracket a coiled tensioning spring 27 which normally holds the short arm against a stop 28 on the bracket or mounting 22. Upon each brake band dust shield of the rear wheel brakes 10 is secured a bracket or mounting 29, the same having therein the roller or spool 30 with the long and short arms 31 and 32 respectively, these being identical to the roller or spool 23 and arms 25 and 26 thereof, the cable 12 being trained about the spool or roller 30 and the arms 31 and 32. The cables for the front and rear brakes are connected through the couplings 33 with pull rods 34, these being pivoted to cranks 35 secured at 36 to the sleeves 15 at their outer ends, these cranks 35 being located outside of the chassis A.

The long arm 31 has connected thereto a coiled tension spring 37, the same being also connected to the mounting or bracket 29 and functions identically to the spring 27.

Each spool or roller 23 and 30 has fitted therein an oiling cup 38 for lubrication thereof.

In the operation of the brakes 10 pressure on brake pedal 19 creates a pull upon rod 20, thus moving the equalizer levers 16 and 17 in a forward direction. This motion causes the levers 35 to pull upon the rods 34 and cables 12 turning the rollers or spools 23 and 30 in a circular path, the long arms 26 and 31 being drawn back by the pressure and the small arms 25 and 32 moving in a cross direction pulling the cables 12 out of brake drums in a straight line and increasing the leverage between their brake bands and the operating device. As the pressure is applied at the brake pedal 19, the cables 12 slide around the rollers or spools 23 and 30 until there is an equal pressure at each brake 10 and following this increased leverage is effected. When pressure is released from brake pedal 19 the springs 27 and 37 become active to return the boosting device to normal condition and in such condition the arms 25 and 32 are engaged with the stop 28 on the bracket or mounting 22 and the abutment 39 on the mounting or bracket 29.

The distance between the short arm 25 or 32 and the brakes 10 is sufficient to allow the cables and brakes to work freely at any position of the front wheels or axles or springs.

From the foregoing it is thought that the construction and manner of operation of the device will be clearly understood and therefore a more extended explanation has been omitted.

It is of course understood that changes, variations and modifications may be made in the invention as fall properly within the scope of the appended claims without departing from the spirit of the invention or sacrificing any of its advantages.

What is claimed is:—

1. A brake device for four wheel vehicles comprising a pressure equalizing means adapted to be located upon the vehicle, cables connecting operating parts of brakes on opposite wheels of the vehicle with the said equalizing means, rollers having the cables trained about the same, and long and short arms on said rollers and acting upon the cables for varying the leverage for operating said cables.

2. A brake device for four wheel vehicles comprising a pressure equalizing means adapted to be located upon the vehicle, cables connecting operating parts of brakes on opposite wheels of the vehicle with the said equalizing means, rollers having the cables trained about the same, long and short arms on said rollers and acting upon the cables for varying the leverage for operating said cables, and a foot pedal connected with said equalizing means.

3. A brake device for four wheel vehicles comprising a pressure equalizing means adapted to be located upon the vehicle, cables connecting operating parts of brakes on opposite wheels of the vehicle with the said equalizing means, rollers having the cables trained about the same, long and short arms on said rollers and acting upon the cables for varying the leverage for operating said cables, a foot pedal connected with said equalizing means, and means active upon the arms to normally hold the same against movement.

4. A brake device for four wheel vehicles comprising a pressure equalizing means adapted to be located upon the vehicle, cables connecting operating parts of brakes on opposite wheels of the vehicle with the said equalizing means, rollers having the cables trained about the same, long and short arms on said rollers and acting upon the cables for varying the leverage for operating said cables, a foot pedal connected with said equalizing means, means active upon the arms to normally hold the same against movement, and pull rods connected with the equalizing means and said cables.

5. A brake device for four wheel vehicles comprising a pressure equalizing means adapted to be located upon the vehicle, cables connecting operating parts of brakes on opposite wheels of the vehicle with the said equalizing means, rollers having the cables trained about the same, long and short arms on said rollers and acting upon the cables for varying the leverage for operating said cables, a foot pedal connected with said equalizing means, means active upon the arms to normally hold the same against movement, pull rods connected with the equalizing means and said cables, and mountings for the said rollers, one pair of mountings being supported upon the vehicle and the other pair carried by stationary parts of a pair of the brakes.

WILLIAM H. MOSELEY.